Jan. 8, 1963  W. CARLS  3,072,148
VALVE HOUSING MOUNT AND MANIFOLD
Filed April 9, 1956  2 Sheets-Sheet 1
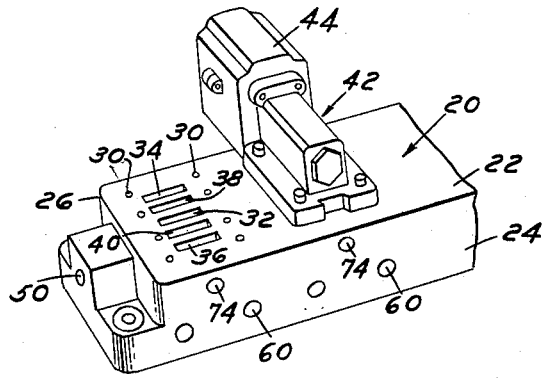
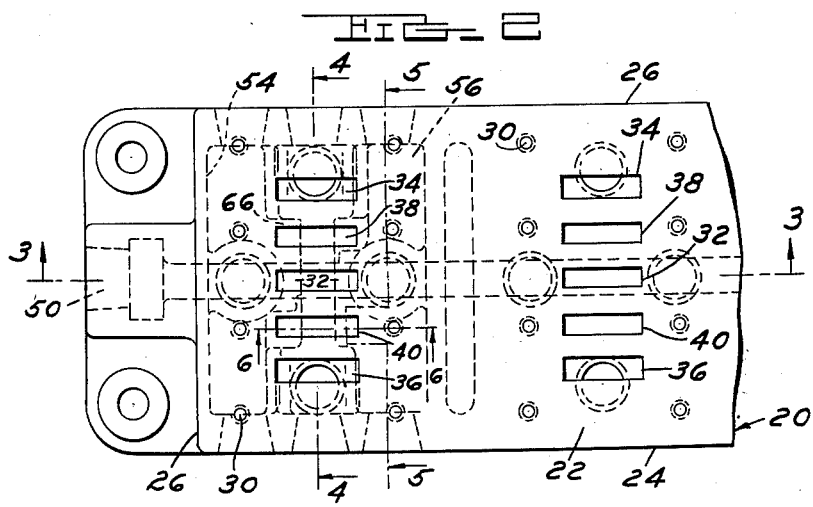
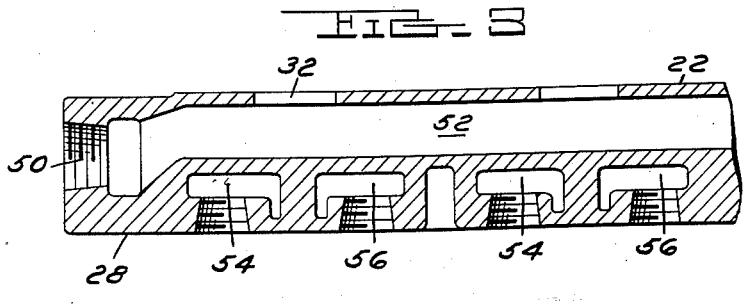
INVENTOR.
WILLIAM CARLS
BY
ATTORNEYS

INVENTOR.
WILLIAM CARLS
BY
ATTORNEYS

United States Patent Office 3,072,148
Patented Jan. 8, 1963

3,072,148
VALVE HOUSING MOUNT AND MANIFOLD
William Carls, 106 S. Main St., Milford, Mich.
Filed Apr. 9, 1956, Ser. No. 576,991
1 Claim. (Cl. 137—622)

This invention relates to a manifold and mount for air valves and has particularly to do with a universal manifold of a construction which is adapted to receive a plurality of valves, either air operated or solenoid operated, in one or both directions.

It is an object of the invention to provide a manifold which can be completely hooked up with an air source of supply and with work cylinders and arranged such that valves can be applied and removed from the manifold without disturbing the connections to the air cylinders or air supply.

It is also an object of the invention to provide a manifold which has all the necessary port connections for a valve housing on one surface thereof and which has connections for cylinder ports, exhaust outlets, and so forth, on a plurality of other surfaces to permit the device to be used in numerous different set-ups with connections coming in from either side or both sides and the bottom.

Drawings accompany the specification, and the various views thereof may be briefly described as:

FIGURE 1 a perspective view showing the manifold with a valve station open and a valve in place at another station.

FIGURE 2 a plan view of the device showing in dotted lines the various passages therethrough.

FIGURE 3 a section on line 3—3 of FIGURE 2 showing the relationship of the passages therein.

Figure 4:
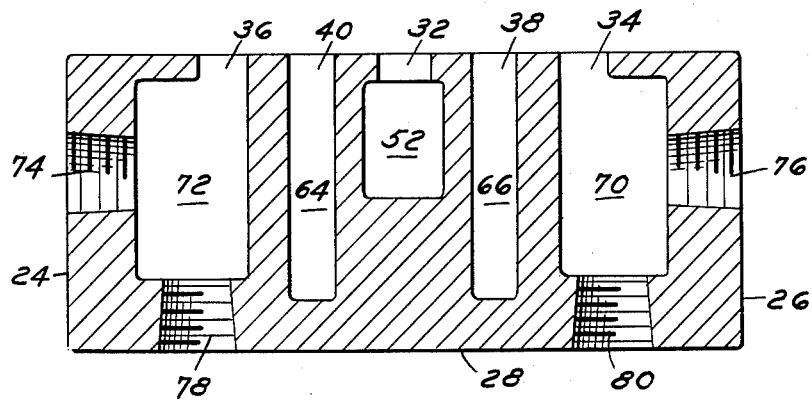

FIGURE 4 a lateral section on line 4—4 of FIGURE 2.

Figure 5:
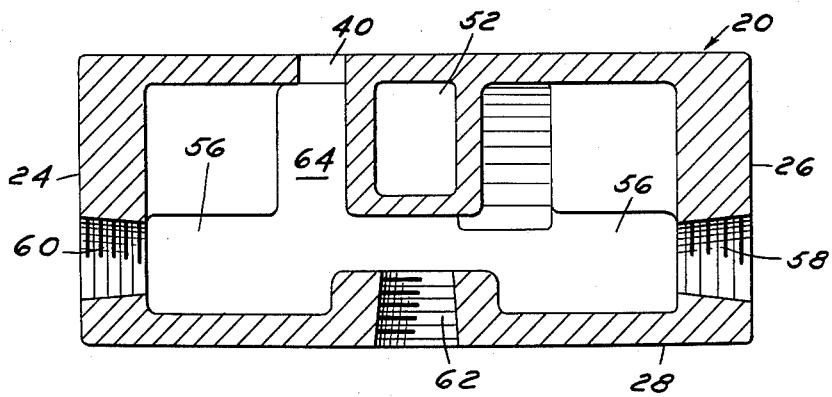

FIGURE 5 a lateral section on line 5—5 of FIGURE 2.

Figure 6:
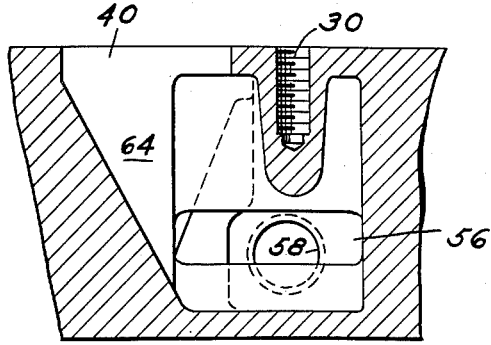

FIGURE 6 a partial section on line 6—6 of FIGURE 2.

Referring to the drawings, a manifold body 20 has a top surface 22 and two side surfaces 24 and 26. A bottom surface is designated 28. The top surface is provided with a plurality of valve stations, each of which has drilled holes 30 for locating the valve and each of which has five parallel ports, the center port 32 being a pressure port, the two end ports 34 and 36 being exhaust ports and the two intermediate ports 38 and 40 being motor ports.

A valve of the type described in my co-pending application Serial No. 576,990, filed April 9, 1956, is used to direct pressure from the central port to either of the motor ports and exhaust from the motor ports to either of the respective exhaust ports adjacent the motor ports. A valve housing 42 is shown in position on the manifold as it would be installed, a gasket being provided between the valve and the surface 22 to seal the valve body to the manifold.

Housing 44 encloses a solenoid for actuating a valve spool within the housing 42. Pressure is fed to the manifold through an opening 50 at the end of the housing, which opening leads to a longitudinal central passage 52 extending down through the housing to a suitable alternate port at the other end, not shown. One end of the passage 52 would be plugged as a general rule, and the other end would be connected to a source of pressure supply. Each of the central ports 32 open downwardly into the central passage 52. Cross passages are cored into the housing to serve as cylinder connections.

In FIGURE 2, shown in dotted lines, two cylinder passages 54 and 56 are shown. These are almost identical in shape, and a sectional view on line 5—5 of FIGURE 2 is shown in FIGURE 5, wherein the cylinder port 40 is connected to the passage 56 which extends across the manifold 20 passing below the pressure passage 52 and having at each end a port hole 58 and 60 which terminates at the sides 24 and 26 of the manifold.

Also, this passage 56 is connected to the bottom surface 28 of the device through a port 62. The passage 56 is extended longitudinally of the device at 64 to connect to the cylinder port 40, and the passage 54 has a similar offset portion 66 to associate it with the cylinder port 38.

Exhaust ports 34 and 36 are connected to exhaust passages 70 and 72 lying to either side of the device and connected to the sides 24 and 26 by ports 74 and 76 and connected to the bottom 28 by ports 78 and 80.

It will thus be seen that each of the ports on the top surface of the device, with the exception of the supply, can be connected to the bottom surface 28. It will also be seen that each of such ports can be connected respectively to the sides of the manifold 24 or 26. Thus, the piping can be arranged at the convenience of the user to adjust to any particular set-up.

I claim:

A manifold mount for a plurality of individual valve housings, each having a plurality of exhaust and cylinder ports, and a pressure inlet, said mount comprising an elongate block having a plurality of spaced valve mount stations on one flat surface, each station having an aligned series of ports to register with similar ports on the bottom face of a valve housing, said series of ports comprising a central pressure port, and at each end, exhaust ports, intermediate ports between the pressure port and the exhaust ports, constituting cylinder ports, said block including a longitudinal passageway extending lengthwise thereof and spaced upwardly from the bottom and connected directly to each of said pressure ports, said block including a plurality of groups of passageways spaced longitudinally along the block interlaced with said longitudinal passage, each group comprising a pair of exhaust passageways lying downwardly and outwardly from the exhaust ports at about the level of the longitudinal passage to connect to the side or bottom walls of the block, and a pair of motor port passages lying in spaced parallel relation below and transverse to said longitudinal passage and spaced on either side of said exhaust passages to connect to the bottom and each side wall of the block.

References Cited in the file of this patent
UNITED STATES PATENTS
2,057,087    De Millar _____ Oct. 13, 1936